United States Patent [19]

Bey

[11] Patent Number: 4,530,375
[45] Date of Patent: Jul. 23, 1985

[54] ATTENUATING ROTATING VALVE

[76] Inventor: Roger Bey, 19, Rue des Rossignols, 68110 Illzach, France

[21] Appl. No.: 103,182

[22] Filed: Dec. 11, 1979

[30] Foreign Application Priority Data

Jan. 10, 1979 [FI] Finland ................................. 790084

[51] Int. Cl.³ .......................... F16K 5/10; F16K 47/04
[52] U.S. Cl. ................................ 137/625.32; 251/121; 251/127; 137/614.17
[58] Field of Search .................... 137/614.17, 625.32, 137/625.31; 251/127, 118, 121

[56] References Cited

U.S. PATENT DOCUMENTS

| 2,585,290 | 2/1952 | Walker | 251/121 X |
| 2,809,662 | 10/1957 | Ray | 137/614.17 |
| 2,911,009 | 11/1959 | Parker |  |
| 3,630,229 | 12/1971 | Nagel | 251/118 X |
| 3,826,281 | 7/1974 | Clark | 251/127 X |
| 4,212,321 | 7/1980 | Hulsey | 251/127 X |
| 4,226,263 | 10/1980 | Muchow | 137/614.17 |

FOREIGN PATENT DOCUMENTS

| 1200688 | 11/1958 | Fed. Rep. of Germany ...... 251/127 |
| 2352370 | 4/1975 | Fed. Rep. of Germany . |
| 2359717 | 6/1975 | Fed. Rep. of Germany . |
| 1010200 | 3/1952 | France . |
| 1498325 | 9/1967 | France . |
| 1490409 | 11/1977 | United Kingdom . |

Primary Examiner—Arnold Rosenthal
Attorney, Agent, or Firm—Cushman, Darby & Cushman

[57] ABSTRACT

An attenuator valve is provided by utilizing a closure member having a fluid passage therethrough and an attenuator device disposed in the passage of the closure member which protrudes therefrom and which provides a variable degree of attenuation dependent upon the degree to which the valve is opened. The degree of attenuation is proportional to the degree to which the valve is opened. The closure member in combination with the attenuator device provides an optimal attenuation in the full range of valve settings with decreasing attenuation as the valve is opened, and so that at full open position the attenuator device does not significantly restrict the flow of fluid.

7 Claims, 12 Drawing Figures

ATTENUATING ROTATING VALVE

BACKGROUND OF THE INVENTION

1. Field of the Invention

The present invention relates to a valve which is turnably fitted with a substantially ball-like (i.e. having a regular curved exterior surface such as a ball-segmental-shaped, or conical or cylindrical plug-like configuration) closure member having a flow passage therethrough which preferably is seated in the valve assembly. More particularly, the invention pertains to the utilization of attenuator plate means disposed substantially parallel to the dimensional length of the bore in the closure member. The closure member includes a stem for rotating the closure member in the valve assembly. The stem is sealed in the valve assembly by means of bearings perpendicular to the longitudinal direction of the flow port along with a pair of sealed glands. The valve assembly, in cooperation with the attenuator plate means operates to attenuate the flow of fluids or medium passing through the valve.

2. Description of the Prior Art

In the field of flow passages and the utilization of pipes to direct flow, valves have been utilized to distribute the pressure drop into several phases and to control and stop flow. In the prior art it is known that a closure member may be furnished with a punched plate-like attenuator device, which has been disposed in a transverse position with regard to the longitudinal direction of the flow passage through the closure member. Such prior art attenuator devices are disadvantageous when the valve is fully open, because when the valve is fully open the attenuator device operates to restrict the flow capacity. On the other hand, if there is no attenuation or little attenuation, cavitation is produced in the valve, causing vibration, noise and wear, at high pressure ranges, especially where compressible fluids are employed.

SUMMARY OF THE INVENTION

The disadvantages and limitations of prior art valves having attenuators which are effective in attenuation but restrict the flow of fluid are obviated by valve assemblies employing attenuators in accordance with the present invention. The present attenuator valve assembly combines the advantages of a non-attenuator closure member by not restricting the flow when the valve is fully open while at the same time providing effective attenuation at all partially open positions with the degree of attenuation dependent upon the related pressure between the upstream and downstream portions of the valve. More particularly, the present invention provides for variable controlled attenuation which is achieved by the configuration of the valve assembly in cooperation with the disposition of perforated barrier means (an attenuator plate or like structure) in the passage of the closure member to vary the amount of attenuation relative to the amount of attenuation required by the degree to which the valve is opened.

The advantages of the present invention are achieved by disposing the attenuator structure in the bore of a closure member preferably in a position which is parallel to the longitudinal direction of the flow passage in the closure member. The attenuator device is inserted parallel to the axis of the passage in the closure member and is designed to protrude from the passage in the closure member into the valve casing up to, or close to, the rotational pattern of the closure member to provide a variable attenuation.

The present invention produces an improved valve provided with an attenuator device which-when the valve is in fully open position—results in an attenuation which negligibly affects the flow. The functioning of the valve remains similar to that of a non-attenuated valve of corresponding size in the fully open position, but when the pressure drop is great upstream (in comparison to downstream, such as where attenuation is required), the attenuation device effectively attentuates the flow in the variable control range of the valve.

The valve in accordance with the invention is mainly characterized in that the attenuator device is capable of attenuating in both flow directions and consists of perforated barrier means—such as at least one attenuator plate—firmly attached to the flow opening of the closure member. If more than one attenuator plate is employed, it is preferable to place them side-by-side and at a distance from each other, whereby the ends of said attenuator plate or plates protrude up to, or very close to, the surface level of the rotation pattern of the closure member. The attenuator plate or plates include holes or apertures passing through the plate which assist in the attenuating function of the plates.

It is the primary object of the present invention to provide an attenuator valve assembly that will not substantially restrict flow when in the open position, but will effectively perform an attenuating function in a variable control range. This and other objects of the invention will become clear from an inspection of the detailed description of the invention, and from the appended claims.

DETAILED DESCRIPTION OF THE DRAWINGS

Figure 1:
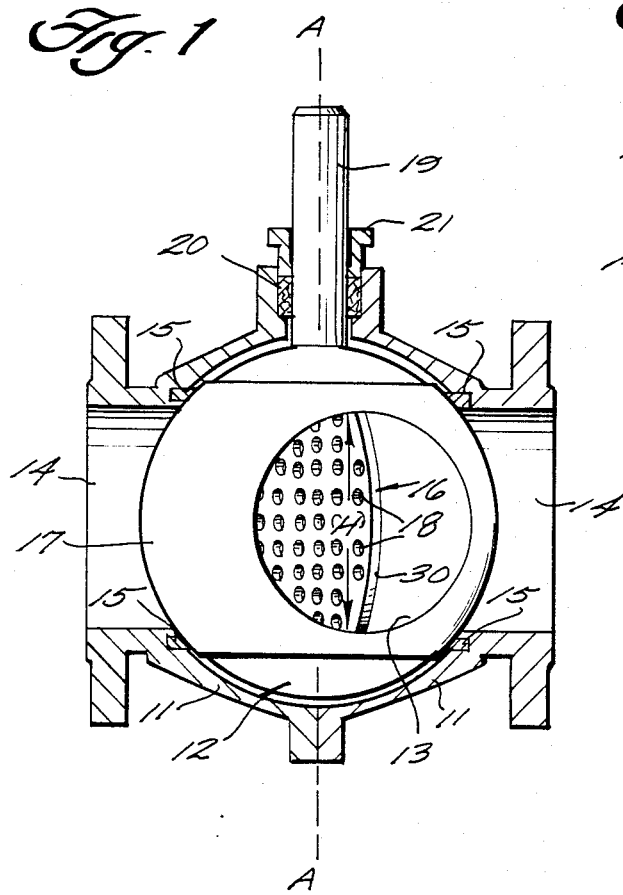
FIG. 1 is a side view showing an exemplary ball valve assembly according to the present invention with the valve housing in cross-section and with the ball closure member in elevation.

An exemplary attenuating valve assembly, and various embodiments thereof, are illustrated in the drawings. The valve assembly includes the conventional components of a valve body 11 having a flow passageway 14 formed therethrough; a closure member 12 having a regular curved exterior surface 17 and having a single elongated bore 13 formed therethrough; and means for mounting the closure member 12 in the valve body 11 for rotation about an axis A—A with respect to the valve body 11. The mounting means include the valve stem 19 (which preferably is one-piece with the ball 12), a conventional packing 20, and a conventional gland 21. The mounting means provide for rotation of the closure member 12 to and between an open position (see FIG. 3) wherein the bore 13 is substantially in line with the flow passageway 14, and a closed position (just past the position illustrated in FIG. 2) wherein the bore 13 is substantially perpendicular to the flow passageway 14. The closure member bore 13 has a predetermined height H (see FIG. 1) in the dimension of the closure member axis of rotation A—A, and a predetermined length L in the dimension of elongation thereof. The valve assembly further conventionally comprises sealing means 15 provided in the valve body 11 flow passageway 14 for operatively engaging the closure member curved exterior surface 17, and preventing fluid passage through the flow passageway 14 from one end thereof to the other except through the closure member bore 13.

Figure 2:
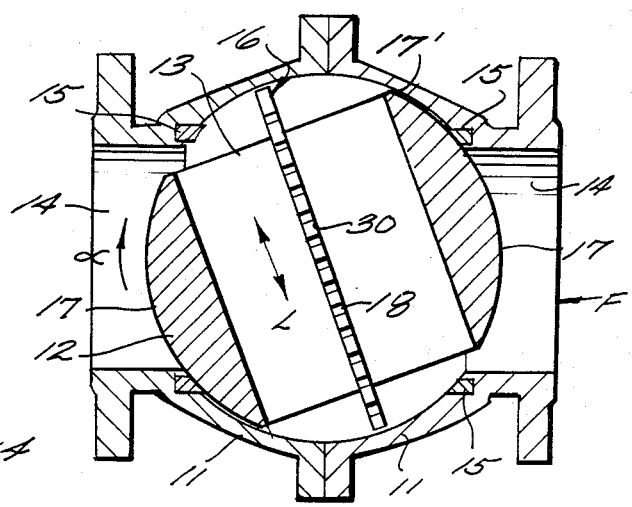
FIG. 2 is a longitudinal sectional view of the valve assembly of FIG. 1 taken at the center of the flow passage as seen from the valve stem, and in which the closure member is in a variable control range approaching a fully closed position.
Figure 7:
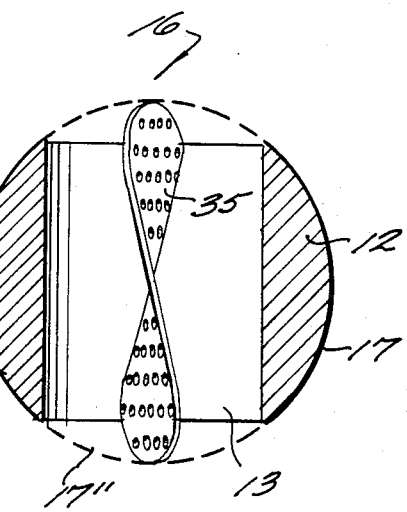
Figure 9:
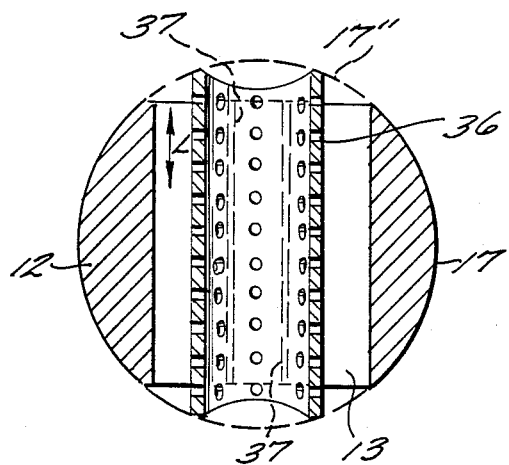
FIG. 9 is a longitudinal sectional view taken along lines B—B of FIG. 8.

According to the present invention, means for attenuating fluid flowing through the closure member bore 13 in either direction without substantially restricting flow when the closure member is in the open position (FIG. 3) are provided, and indicated generally at 16 in the drawings. The attenuating means comprise barrier means having perforations 18 formed therein, the barrier means being mounted in the closure member bore 13, and said means preferably having at least one surface substantially parallel to the dimension of elongation L of the bore 13 and extending substantially entirely the bore predetermined height H, and extending outwardly from either side of the bore 13 to points substantially on a geometric extension 17" of the curved exterior surface of the closure member. Such a geometric extension 17" is illustrated most clearly in FIGS. 3, 7, and 9. With the barrier means arranged in such a manner, there is sufficient clearance between the barrier means end portions which extend outwardly of the bore 13 and the cooperating interior curved surface 17' of the valve body 11 so that rotation between the fully open and fully closed positions is allowed, however the clearance is small enough that the barrier means very effectively performs its attenuating function in its variable control range (such as illustrated in FIG. 2).

The closure member 12 may take a wide variety of forms. Preferably it comprises a conventional ball closure member, although other closure members having regular curved exterior surfaces may also be utilized, such as ball-segmental-shaped closure members, conical plug-like closure members, or cylindrical plug-like closure members.

The bore 13 in the closure member 12 may have a wide variety of configurations, although preferably it is circular in cross-section, and of constant diameter. In the embodiment of the invention illustrated in FIG. 5 (which is especially suited for high pressure environments) the bore 13' does not have a constant diameter, but rather is tapered so it is narrower on the upstream side of the closure member 12 than on the downstream side. Other bore configurations also are utilizable.

Figure 3:
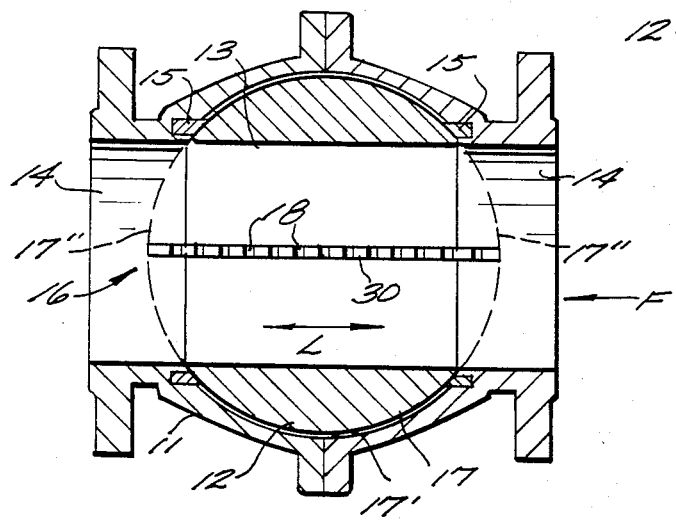
FIG. 3 illustrates the valve assembly of FIG. 2 wherein the closure member is in an open position.

While certain configurations are preferred and have advantages, especially for particular environments, in general the attenuating barrier means 16 may comprise any type of perforated surface capable of performing the desired attenuating function. One form that the barrier means 16 may desirably take is that of a single plate 30, as illustrated in FIGS. 1 through 3. The plate 30 engates both the bottom and the top of the bore 13, thus spanning the entire height H of the bore 13, and extends parallel to the dimension of elongation L of the bore 13. As illustrated most clearly in FIG. 3, the ends of the plate 30 extend outwardly from the closure member 12 to substantially the geometric extension 17" of the curved exterior surface 17 of the closure member. By constructing the attenuating means 16 in this manner, it will be seen that in the fully opened position of the valve, as illustrated in FIG. 3, the plate 30 does not significantly restrict the fluid flow through the passage 14 in bore 13, however in variable control positions of the closure member 12—as illustrated in FIG. 2—the plate 30 very effectively performs an attenuating function since fluid must flow through the perforations 18 therein in order to pass from one end of the fluid passageway 14 to the other, the construction of the plate 30 relative to the rest of the assembly components preventing passageway of any substantial amount of fluid around the plate 30.

Figure 4:
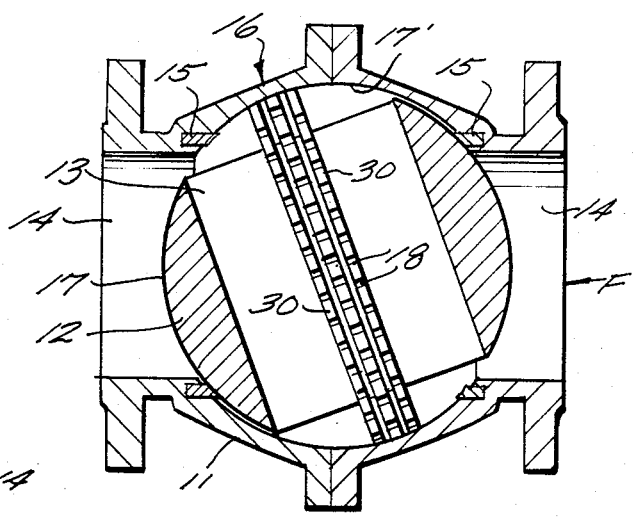
FIGS. 4, 5, 6, and 7 are longitudinal views of alternative embodiments of the valve assembly according to the present invention.

In the embodiment illustrated in FIG. 4 three plates 30 are provided. In situations where more than one attenuating surface is utilized, such as the plurality of plates 30 in the FIG. 4 embodiment, preferably the perforations (holes or apertures) 18 of adjacent surfaces are not in alignment. For instance in FIG. 4, the perforations 18 in the two outer plates are not in alignment with the perforations in the center plate. Where a plurality of attenuating surfaces are utilized with compressible mediums, it is preferred that the perforations 18 in the attenuating surfaces closest to the upstream portion of the closure member have the least aperture area in relation to the total area of the attenuating surface, and that the perforation area of each successive attenuator surface increases in the flow direction. For instance in the FIG. 4 embodiment it would be advantageous to increase the size of the perforations 18 from plate 30 to plate 30 in the direction of fluid flow indicated by the arrow F.

Figure 5:
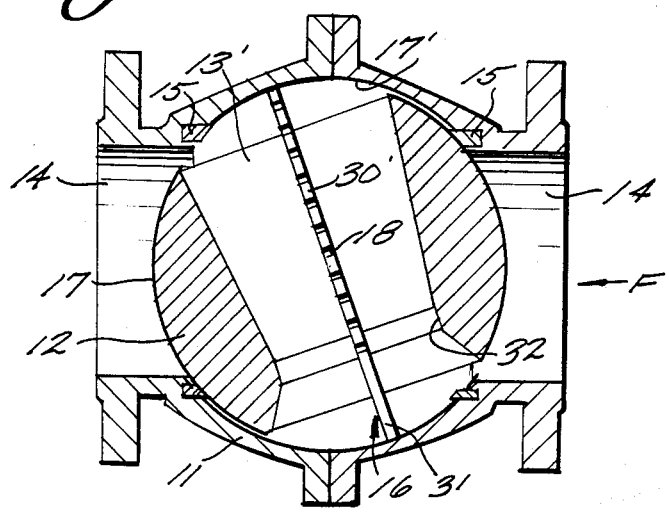

In the FIG. 5 embodiment, which as previously indicated is most useful involving high pressure compressible mediums, a plate 30' is provided that is slightly different from the plates 30 illustrated in the FIGS. 1 through 4 embodiments. In the plate 30', an upstream end 31 thereof is provided that is free of perforations 18, the perforations only being provided downstream of the smallest cross-sectional portion 32 of the bore 13'.

Figure 6:
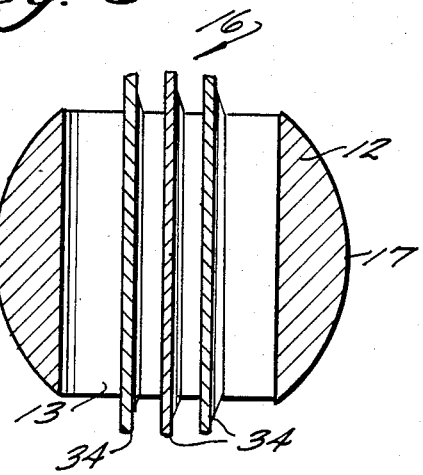
Figure 8:
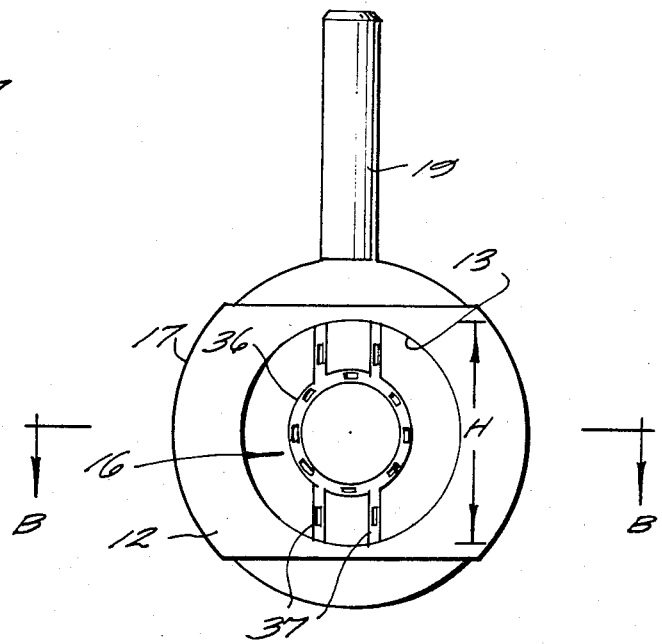
FIG. 8 is an end view of still another modified form of the ball closure element utilizable in the valve assembly according to the invention.

In the embodiment according to the invention illustrated in FIG. 6, the attenuating barrier means 16 comprise a plurality of perforated structures 34 that are in the form of curved cylinder portions. In the FIG. 7 embodiment, the perforated barrier means 16 comprises a structure 35 essentially consisting of a perforated plate twisted into a spiral configuration. In the embodiment illustrated in FIGS. 8 and 9, the barrier means 16 includes a tubular structure 36 concentric with and substantially smaller than the bore 13, and preferably supported at the top and bottom thereof by one or more perforated plates 37. Both the tube 36 and the plates 37 are substantially parallel to the dimension of elongation L of the bore 13.

Figure 10:
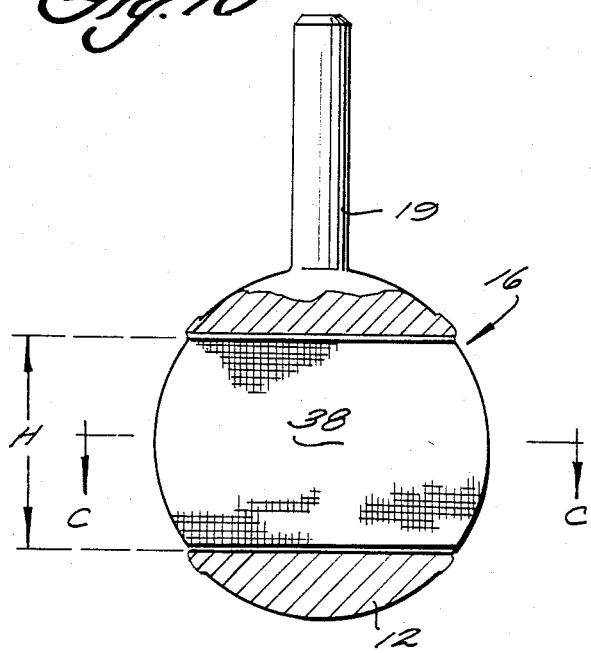
FIG. 10 is a sectional view of yet another embodiment of a ball element according to the present invention, the section being taken along a plane parallel to the stem and illustrating an attenuator device in elevation.
Figure 11:
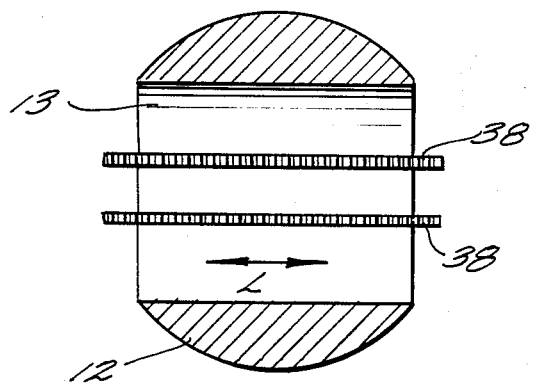
FIGS. 11 and 12 are longitudinal sectional views of two different modifications of the embodiment of FIG. 10.
Figure 12:
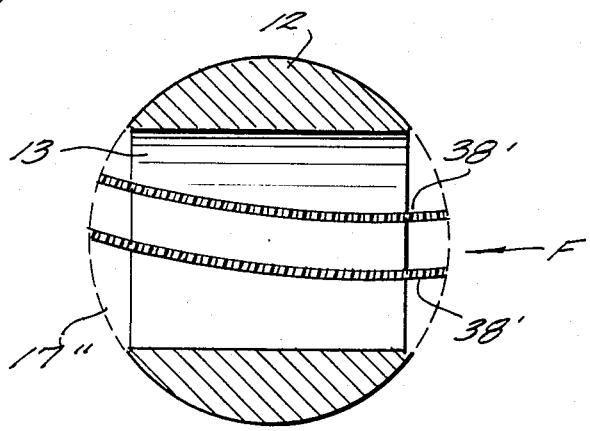

The exact nature of the perforations or apertures formed in the barrier means 16 may also take a wide variety of forms. In the embodiments illustrated in FIGS. 10 through 12, the barrier means 16 comprise one or more screens 38, 38'. The screens 38 are planar, while the screens 38' are curved in the direction of flow F.

An exemplary manner of construction and method of operation of the valve assembly according to the present invention will now be described with particular reference to the FIGS. 1 through 3 embodiment. An integral one piece ball 12 and stem 19 closure member is constructed, having a circular cross-section constant diameter bore 13 formed therein, and a curved regular exterior surface 17. The ball 12 and stem 19 are mounted in a conventional valve housing 11 having sealing rings comprising sealing means 15 which engage the curved exterior surface 17 of the ball 12 to prevent fluid flow through the valve housing 11 passageway 14 except through the bore 13, and a conventional packing 20 and gland 21 are provided for receiving the stem 19. A perforated plate 30 is welded, braized, soldered, glued, or otherwise attached to the interior surface of the ball 12 defining the bore 13, so that the plate 30 extends substantially parallel to the dimension of elongation L of the bore 13, and spans substantially the entire height H of the bore 13, ends of the plate 30 extending outwardly from either end of the bore 13 to points substantially on the geometric extension 17" of the curved exterior surface 17 of the ball 12.

When it is desired to allow the flow of fluid from one end of the passageway 14 to the other, the stem 19 is rotated so that the bore 13 is substantially in-line with the flow passageway 14, as illustrated in FIG. 3. In this position, the plate 30 does not significantly restrict fluid flow in direction F, or in the opposite direction (if provided). When it is desired to close the valve, the ball 12 is rotated about the axis A—A by rotation of the stem 19 in direction α—see FIG. 2—during which rotation the plate 30 extends so that more and more surface area thereof progressively comes in contact with fluid flowing in the direction F, until finally the leading edge of the plate 30 passes the sealing ring 15, while the trailing edge thereof passes the opposite sealing ring 15, at which point—and until the ball 12 is in its fully closed position with the bore 13 perpendicular to the direction of flow F—fluid flowing through the bore 13 must pass through the attenuator plate 13, and thus is attenuated.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An attenuator valve assembly comprising: a valve body having a flow passage formed therethrough; a closure member having a regular curved exterior surface and having a single elongated bore formed therethrough; means for mounting said closure member in said valve body for rotation about an axis with respect to said valve body to and between an open position wherein said bore is substantially inline with said flow passage, and a closed position wherein said bore is substantially perpendicular to said flow passage; said closure member bore having a predetermined height in the dimension of said closure member axis of rotation, and a predetermined length in the dimension of elongation thereof; sealing means provided in said valve body flow passage for operatively engaging said closure member curved exterior surface and for preventing fluid passage through said flow passage except through said closure member bore; and means for attenuating fluid flowing through said closure member bore in either direction without significantly restricting flow when said closure member is in said open position, said means comprising perforated barrier means mounted in said closure member bore, said barrier means spanning substantially entirely said bore predetermined height and having an operative perforated portion, with perforations extending substantially perpendicular to said bore, extending outwardly from either end of said bore to points substantially on a geometric extension of said curved exterior surface of said closure member;

said barrier means comprising a plurality of flat plates, and wherein the ratio of perforation area to total plate is smallest in the plate that is most upstream, and largest in the plate that is most downstream.

2. A valve assembly as recited in claim 1, wherein said barrier means includes perforations that are evenly distributed over the entire surface area thereof.

3. An attenuator valve assembly comprising: a valve body having a flow passage formed therethrough; a closure member having a curved exterior surface and having two ends; means for mounting said closure member in said valve body for rotation about an axis with respect to said valve body to and between a completely open position wherein said closure member allows passage of fluid through said flow passage, and a completely closed position wherein said closure member blocks all flow through said flow passage; sealing means provided in said valve body flow passage for operatively engaging said closure member curved exterior surface and for preventing fluid passage through said flow passage past said closure member when said closure is in said closed position; and means for attenuating fluid flowing through said flow passage past said closure member, without significantly restricting flow when said closure member is in said completely open position, said means comprising perforated barrier means mounted with said closure member, said barrier means extending to points substantially on a geometric extension of said curved exterior surface of said closure member and having an operative perforated surface extending exteriorly of said closure member at each end thereof, the perforations in said perforated surface extending exteriorly of said closure member at each end thereof, the perforations in said perforated surface extending substantially perpendicular to said bore;

said barrier means comprising at least one planar plate, and wherein said planar plate is mounted with respect to said closure member so that the plane of said plate is parallel to said flow passage in said completely open position of said closure member.

4. A valve assembly as recited in claim 3 wherein said barrier means comprises a plurality of planar plats, each plate mounted with respect to said closure member so that the plane of each of said plates is parallel to said flow passage in said completely open position of said closure member.

5. A valve assembly as recited in claim 4 wherein said closure member comprises a ball having a bore therein, and wherein said plates are mounted in said bore, extending outwardly therefrom to points substantially on a geometric extension of said curved exterior surface of said ball.

6. An attenuator valve assembly comprising: a valve body having a flow passage formed therethrough; a closure member having a curved exterior surface; means for mounting said closure member in said valve body for rotation about an axis with respect to said valve body to and between a completely open position wherein said closure member allows passage of fluid through said flow passage, and a completely closed position wherein said closure member blocks all flow through said flow passage; sealing means provided in said valve body flow passage for operatively engaging said closure member curved exterior surface and for preventing fluid passage through said flow passage past said closure member when said closure member is in said closed position; and means for attenuating fluid flowing through said flow passage past said closure member, so that a progressively greater resistance to flow is provided as the closure member is moved from open to closed position, and so that flow is not significantly restricted when said closure member is in said completely open position, said means comprising perforated barrier means mounted with said closure member is in said completely open position, said means comprising perforated barrier means mounted with said closure member, said barrier means extending to points substantially on a geometric extension of said curved exterior surface of said closure member;

said barrier means comprising a plurality of planar plates, the ratio of perforation area to total plate area is smallest in the plate that is most upstream, and largest in the plate that is most downstream.

7. An attenuator valve assembly comprising: a valve body having a flow passage formed therethrough; a closure member having a regular curved exterior surface and having a single elongated bore formed therethrough; means for mounting said closure member in said valve body for rotation about an axis with respect to said valve body to and between an open position wherein said bore is substantially inline with said flow passage, and a closed position wherein said bore is substantially perpendicular to said flow passage; said closure member bore having a predetermined height in the dimension of said closure member axis of rotation, and a predetermined length in the dimension of elongation thereof; sealing means provided in said valve body flow passage for operatively engaging said closure member curved exterior surface and for preventing fluid passage through said flow passage except through said closure member bore; and means for attenuating fluid flowing through said closure member bore in either direction so that a progressively greater resistance to flow is provided as the closure member is moved from open to closed position, and that flow is not significantly restricted when said closure member is in said open position, said means comprising perforated barrier means mounted in said closure member bore, said barrier means spanning substantially entirely said bore predetermined height and extending outwardly from either end of said bore to points substantially on a geometric extension of said curvature exterior surface of said closure member;

said barrier means comprising a plurality of planar plates, the ratio of perforation area to total plate area is smallest in the plate that is most upstream, and largest in the plate that is most downstream.

* * * * *